July 5, 1938.  C. E. TURNER  2,122,596
SPRINKLER
Filed Nov. 23, 1936  2 Sheets-Sheet 2
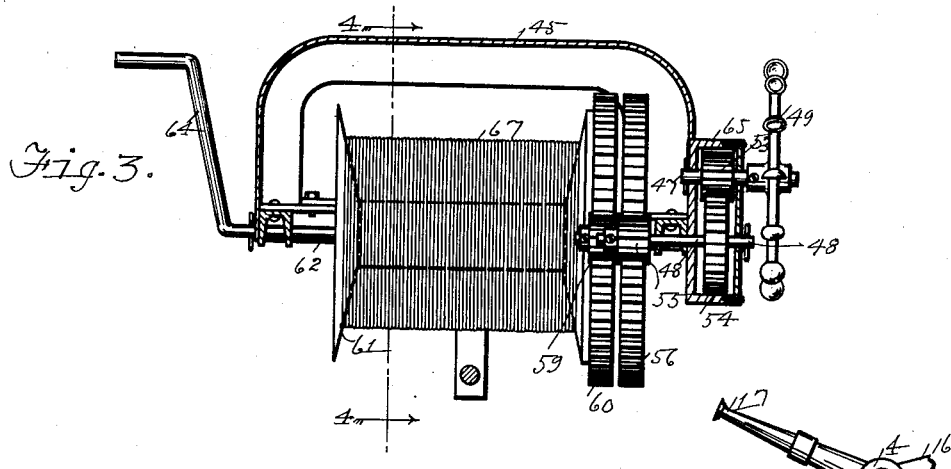
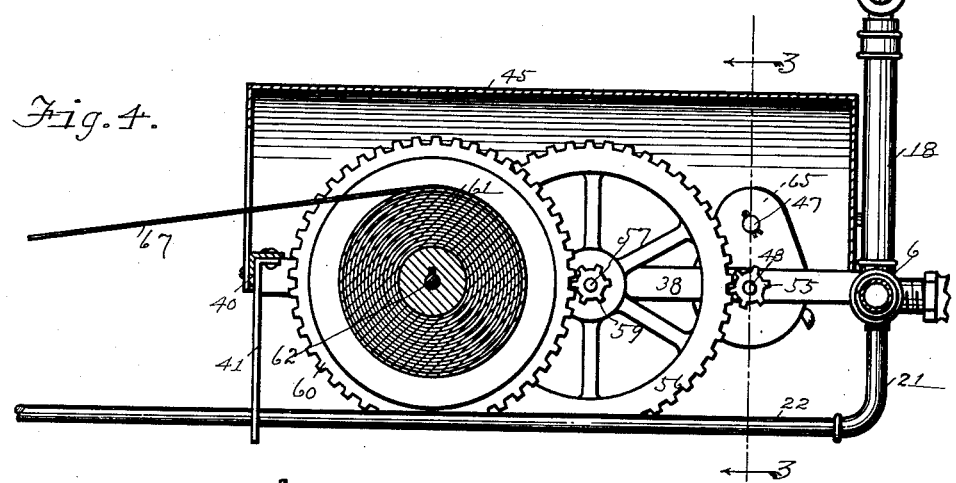
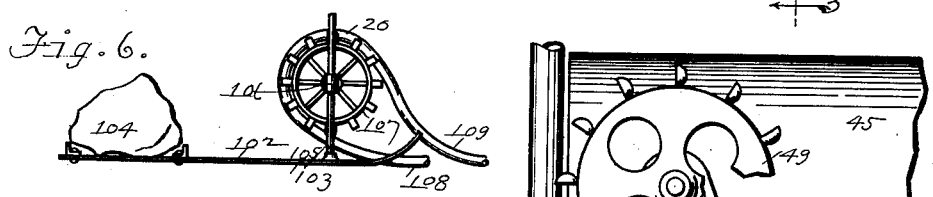
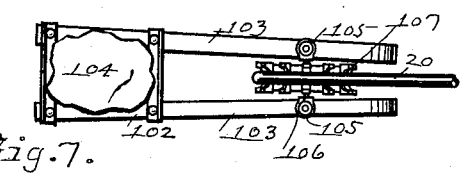
INVENTOR
Cecil E. Turner
BY Rice and Rice
ATTORNEYS
Witness:
John S. Braddock Patented July 5, 1938

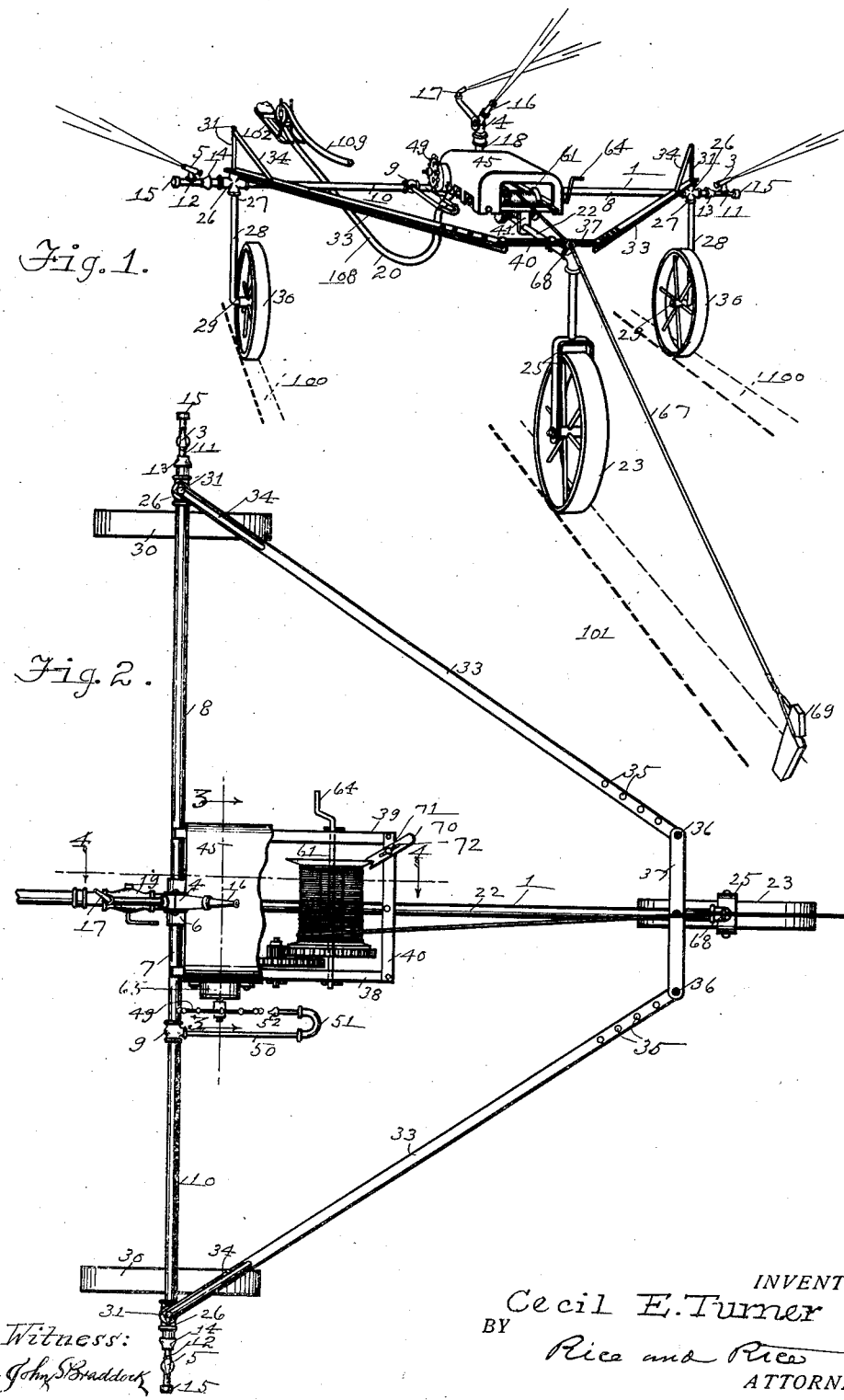

2,122,596

UNITED STATES PATENT OFFICE 2,122,596

SPRINKLER

Cecil E. Turner, Los Angeles, Calif., assignor to March Automatic Irrigation Company, Muskegon, Mich., a corporation of Michigan Application November 23, 1936, Serial No. 112,211

5 Claims. (Cl. 299—49)

The present invention relates to sprinklers, and more particularly to traveling sprinklers intended for horticultural irrigation purposes and suitable also for watering lawns, athletic fields, etc.

The object of the invention is to provide in such a sprinkler mechanism whereby it is moved slowly over the tract to be irrigated by utilization of the pressure of part of the water supplied thereto; and further, to provide such a sprinkler which moves in a predetermined course; and further, to provide such a sprinkler which will travel over uneven ground, small obstructions, or slippery ground without skidding of the wheels; and further, to provide a chassis for such a sprinkler having wheels adjustable to the varying distances between desired paths of the wheels; and further, to provide for such a traveling sprinkler, means for maintaining the sprinkler hose taut.

These and any other and more specific objects hereinafter appearing are attained by, and the invention finds preferable embodiment in, the illustrative structure described in the body of this specification and illustrated by the accompanying drawings, in which:

Figure 1 is a perspective view of my traveling sprinkler in operation;

Figure 2 is a top plan view thereof, a portion of the casing being broken away to show the parts therein;

Figure 3 is a sectional view of operating mechanism taken on line 3—3 of Figures 2 and 4;

Figure 4 is a sectional view of the same taken on line 4—4 of Figures 2 and 3;

Figure 5 is a right hand side view of certain parts, portions being broken away;

Figure 6 is an elevational side view of a device for maintaining the hose taut behind the sprinkler; and Figure 7 is a top plan view of the same.

These drawings show a traveling sprinkler comprising a vehicle body or chassis designated generally 1 upon which is mounted the operating mechanism and appropriate fluid outlets or nozzles.

The chassis is constructed as follows: a 4-way hollow coupling or T, 6, is fitted with two horizontally disposed opposite pipe sections 7 and 8. To the shorter section 7 is connected by means of a 3-way hollow coupling or T, 9, a third section of pipe 10. The pipes 7 and 10 together with their coupling 9 are equal in length to the pipe 8. These pipes and their couplings form the rear portion of the chassis 1, and also serve as fluid conduits to the nozzles 3 and 5 mounted upon the short pipes 11 and 12 respectively, which are connected to the outer ends of pipes 8 and 10 by the reduction couplings 13 and 14 respectively. The short pipes 11 and 12 are threaded at their outer ends to receive the caps 15 (as shown), but may instead have coupled thereto additional extension pipes provided with fluid outlets (not shown).

The fluid outlet 4 is a rotatable sprinkler head having a main nozzle 16 and an angularly disposed nozzle 17, this assembly being rotatably coupled to the upper end of a vertical pipe 18 screw-threaded at its lower end to the outlet in the top of the 4-way coupling or T, 6. A shutoff valve 19 is connected at one end to the rear opening or intake in the 4-way coupling or T, 6, and at the other end to the hose 20 through which water is supplied under pressure from a suitable source to the conduits and nozzles already described.

A rod 21 is secured to the bottom of the coupling or 4-way T, 6, and is threaded at its lower end to receive the rearward end of the rod or pipe 22, on the forward end of which is rotatably mounted a wheel 23 by means of a forked member 25.

Cross shaped members 26 are slidably mounted on the pipes 8 and 10 and have lower portions 27 in which are threaded risers 28 which have inwardly turned bottom portions 29 on which are rotatably mounted wheels 30. Extensions 31 are threaded in the upper portions of members 26 forming pivot pins for angle iron brace rods 33, which have their side flanges cut away at their rearward ends, thus to provide projecting top flanges each having an aperture through which passes one of the extensions 31, said rods being turnable at these points on said extensions. This structure is reinforced by means of braces 34, turnable on the tops of extensions 31 and connected to the top flanges of the brace rods 33. These top flanges of these angle iron rods 33 are pierced near their forward ends with a plurality of apertures 35 which are adapted to receive the bolts 36 on the outer ends of a crossbar 37 which is rigidly bolted at its center to the forwardly extending rod 22 of the chassis.

It will be seen that this construction enables the rear wheels 30 to be drawn toward each other and the brace rods 33 drawn forward and secured to the crossbar 37 in any one of a plurality of places, so that the wheels 30 may thus be adjusted to different distances between their paths 100.

The mechanism which propels the vehicle is constructed and operates as follows: a frame comprises channel bars 38 and 39, mounted at their rear ends on the pipes 7 and 8 respectively and connected at their forward ends by a front angle iron bar 40. The front of said frame is supported by a metal strap 41 having a hole through which passes the rod 22 of the chassis, the upper flange of the strap 41 being fastened to the center of bar 40. The operating mechanism is mounted near the rear of said frame and is provided with a main casing 45, said mechanism comprising an upper shaft 47 and a lower shaft 48. The upper shaft carries on its outer end, outside the side casing 65, a Pelton wheel 49 which is driven by a jet of water supplied from pipe 7 through the 3-way coupling or T, 9, a pipe 50, U-fitting 51 and nozzle 52. The upper shaft 47 also carries a pinion 53 located within the side casing and meshing with a spur wheel 54 carried by the lower shaft 48. This lower shaft extends through bearings in the channel bar 38 and carries on its inner end, inside the main casing, a pinion 55, which meshes with a spur wheel 56 on shaft 57 bearing in channel bar 38. On the inner end of shaft 57 is a pinion 59 which meshes with a gear 60 on a drum 61 which is splined to a shaft 62 bearing in channel bars 38 and 39. Shaft 62 has a crank handle 64 at one end outside the casing. This casing is cut away at the shaft ends so as not to interfere therewith and fits over the mechanism. A cable 67 is fastened at one end to the drum 61 and is wound thereon. This cable passes through an eye 68 on the front of the chassis and is anchored to a stake 69 or to any stationary object.

It will be seen that motion imparted to the Pelton wheel by pressure of the water jet from the nozzle 52 is transmitted to the drum 61 in such manner that the cable is wound up very slowly but with sufficient power to draw the sprinkler vehicle slowly toward the stake.

A lever 70 is provided for disengaging the gear 60 from the pinion 59, to facilitate in winding the cable by hand when the sprinkler is not operated by said mechanism. This lever may be secured in desired position by means of the bolt 71 which passes through a slot 72 in the lever and is threaded in the angle iron 40.

Other mechanical devices for utilizing the pressure of a part of the water supplied to the sprinkler for rotating the drum 61 may be adopted.

It will be seen that a part of the water supplied through the hose 20 passes through the branch pipe 50 under pressure to operate the mechanism for driving the drum 61 and drawing the cable 67 to propel the vehicle over the tract to be watered, while another part of the water supplied under such pressure passes through the pipes 7, 8 to the sprinkling nozzles for irrigating the tract. It will also be seen that the "track" of the rear wheels 30 may be varied and their distance on either side of the front wheel 23 may be varied to provide paths 100, 101 therefor so as to prevent said wheels from engaging planting between said paths.

The coiling or kinking of the hose 20 as it is drawn over the ground behind the vehicle is prevented by looping it over a weighted sled 102 drawn over the ground by the traveling vehicle at about half the speed of its travel. A tautening tension is thus exerted on the hose to prevent the coiling thereof.

In the device best shown in Figures 6 and 7, the spaced runners 103 of the sled having a weight 104, have posts 105 in which the opposite ends of the axle 106 of a sheave-like wheel 107 rotate, the hose being carried by this wheel with one end 108 extending to the traveling sprinkler vehicle and the other end 109 being connected to the source of water supply.

The invention being intended to be pointed out in the claims is not to be limited to or by details of construction of the particular embodiment thereof illustrated by the drawings or hereinbefore described.

I claim:

1. A sprinkler adapted to be travelled over the ground, comprising: a chassis having a main pipe extending transversely the traveling movement of the sprinkler and provided with sprinkling nozzles, and a pipe branching from the main pipe; means carried by the chassis for traveling the sprinkler; a hose drawn over the ground by the traveling movement of the sprinkler; a connection leading from the hose to the main pipe for discharging water under pressure through the nozzles and water under said pressure through the branching pipe for operating said traveling means; chassis-supporting wheels slidably mounted on the main pipe for relative coaxial movement to adjusted positions; means for holding said wheels in such adjusted positions on said pipe.

2. In a traveling sprinkler: a chassis carrying sprinkling nozzles; a hose connected to a water-supplying source and to the nozzles for supplying water thereto under pressure; a device over which the hose is slidably looped between the water-supplying source and the sprinkler said device being adapted to be drawn by the hose over the ground in the sprinkler's traveling movement, for tautening the hose drawn behind the sprinkler.

3. In a traveling sprinkler: a chassis carrying sprinkling nozzles; a hose connected to a water-supplying source and to the nozzles for supplying water thereto under pressure; a device over which the hose is slidably looped between the water-supplying source and the sprinkler said device being adapted to be drawn by the hose over the ground in the sprinkler's traveling movement, for tautening the hose drawn behind the sprinkler, said device constituting a weighted sled having a sheave-like wheel on which the hose is looped.

4. A sprinkler adapted to be travelled over the ground, comprising: a chassis carrying fixed thereon a horizontal main pipe extending transversely the traveling movement of the sprinkler and provided with sprinkling nozzles at its ends; a vertically extending pipe branching from the middle of the main pipe; a sprinkling head continuously rotatable horizontally on the branching pipe; a drum rotatable on the chassis; means for continuously rotating the drum; a water connection between one of the pipes and said means; a cable wound on the drum and anchored in a fixed position; a hose drawn along the ground by the traveling movement of the sprinkler and connected with the main pipe for supplying thereto water under pressure so that a portion thereof passes through the main pipe and its nozzles and through the branching pipe and the sprinkling head for sprinkling the ground and another portion passes through the main pipe and the connection to said means for rotating the drum to travel the sprinkler.

5. A sprinkler adapted to be travelled over the ground, comprising: a chassis carrying a horizontal main pipe extending transversely the traveling movement of the sprinkler; a vertically extending pipe branching from the main pipe; a sprinkling head rotatable horizontally on the branching pipe; a drum rotatable on the chassis; means for rotating the drum; a water connection between one of the pipes and said means; a cable wound on the drum and anchored in a fixed position; a hose drawn along the ground by the traveling movement of the sprinkler and connected with the main pipe for supplying thereto water under pressure so that a portion thereof passes through the main pipe and through the branching pipe and the sprinkling head for sprinkling the ground and another portion passes through the main pipe and the connection to said means for rotating the drum to travel the sprinkler.

CECIL E. TURNER.